United States Patent [19]

Bergner et al.

[11] 4,295,945

[45] Oct. 20, 1981

[54] PROCESS FOR THE PRODUCTION OF LIQUID CHLORINE

[75] Inventors: Dieter Bergner; Kurt Hannesen, both of Kelkheim; Wolfgang Müller, Bad Soden am Taunus; Wilfried Schulte, Hofheim am Taunus, all of Fed. Rep. of Germany

[73] Assignee: Hoechst Aktiengesellschaft, Frankfurt am Main, Fed. Rep. of Germany

[21] Appl. No.: 146,020

[22] Filed: May 2, 1980

[30] Foreign Application Priority Data

May 4, 1979 [DE] Fed. Rep. of Germany ....... 2917974

[51] Int. Cl.³ .............................................. C25B 1/26
[52] U.S. Cl. ................................................. 204/128
[58] Field of Search ....................... 204/128, 129, 98

[56] References Cited

U.S. PATENT DOCUMENTS

| | | | |
|---|---|---|---|
| 3,052,612 | 9/1962 | Henegar et al. | 204/128 |
| 3,410,099 | 11/1968 | Hooker et al. | 62/9 |
| 3,954,430 | 5/1976 | Curtis et al. | 62/23 |
| 4,086,393 | 4/1978 | Hart | 204/128 |

FOREIGN PATENT DOCUMENTS 1125519  8/1968  United Kingdom ................. 62/9

*Primary Examiner*—Howard S. Williams
*Attorney, Agent, or Firm*—Curtis, Morris & Safford

[57] ABSTRACT

In the electrolysis of an aqueous alkali metal chloride solution, a mixture of anolyte and steam-saturated gaseous chlorine is formed in the anode space of the electrolytic cell. According to the invention, the process is carried out under a pressure of at least 8 bars. For workup, the anolyte is at first separated from the steam-saturated gaseous chlorine which is then liquefied under a pressure of at least 8 bars by cooling. In the course of cooling there is obtained a condensate which consists of a liquid water-saturated chlorine phase and a liquid chlorine-saturated water phase. The temperature of said condensate is not to fall below 28° C. during cooling. Finally, the light-weight water phase is separated from the chlorine phase having a heavier specific weight.

10 Claims, 1 Drawing Figure

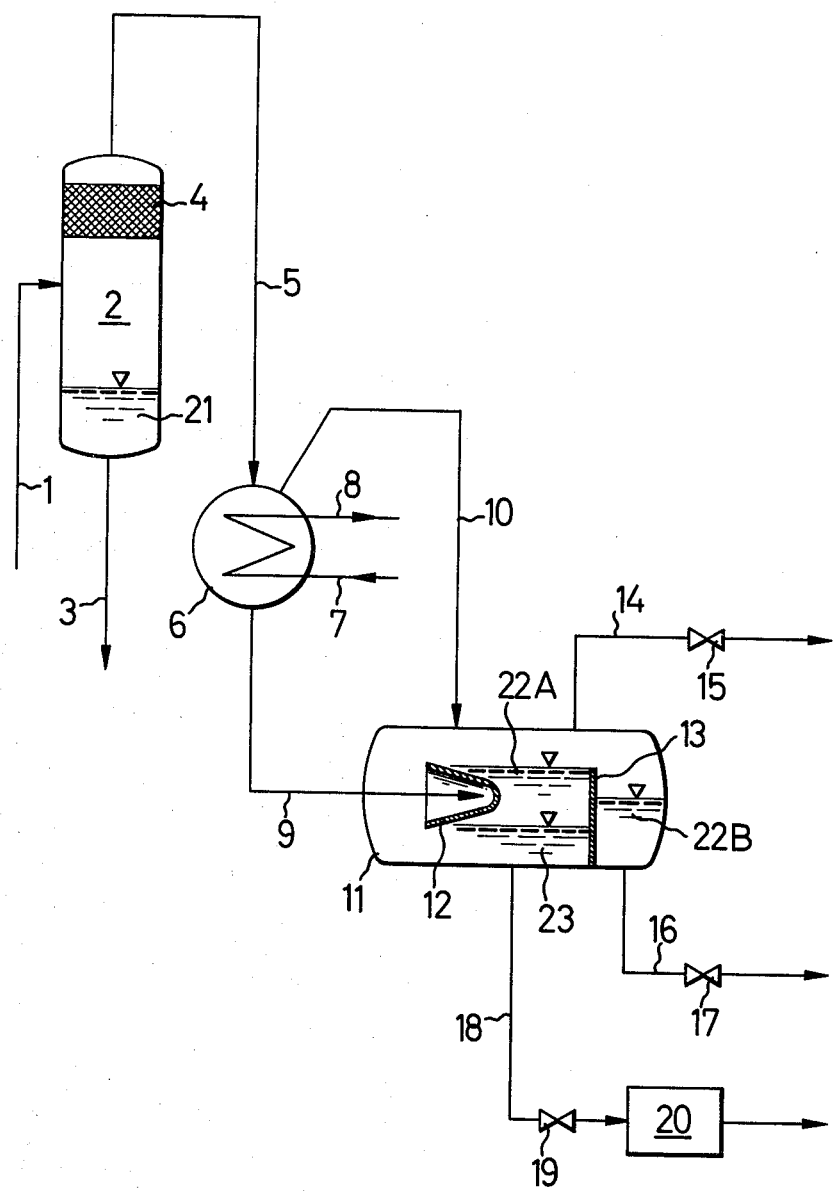

PROCESS FOR THE PRODUCTION OF LIQUID CHLORINE

The invention relates to a process for producing liquid chlorine from gaseous chlorine which is obtained during the electrolysis of an aqueous alkali metal chloride solution.

It is known that in the electrolysis of aqueous alkali metal chloride solutions chlorine is obtained and subsequently purified and liquefied. This process is carried out on an industrial scale in many variations (cf. Hund and Zirngiebl in Winnacker and Kuechler, Chemische Technologie, volume 1, Munich 1969). A common feature of these industrial processes is that chlorine is produced using a pressure which is lower than the liquefaction pressure at the temperature of cooling water. The liquefaction is effected by compression, by cooling, or by a combination of cooling and compression. The type and method of liquefaction depend essentially on the various local conditions with regard to the economy and technology. In many cases, the chlorine obtained is not completely liquefied, and at least part of the chlorine remains in a gaseous state. This avoids the problem of gases such as oxygen, nitrogen, carbon dioxide, and especially hydrogen which originate from the electrolysis, contaminating the chlorine which is known to occur with total chlorine liquefaction. Total liquefaction of the chlorine might also involve the formation of gaseous chlorine-hydrogen mixtures which are within the explosion range. This is why the liquefaction generally requires special purification steps for removing the hydrogen, or precautionary measures to avoid the range between the lower and upper explosion limits with the lowest possible risk.

The measures for example may include a pressure- and shock-proof design of the apparatus in the danger zone, or may avoid a possible explosion by constructing the apparatus according to a special layout (e.g. narrow flow profiles). These difficulties may be avoided, if, as has been mentioned above, a minimum amount of the chlorine produced is eliminated in a gaseous state from the liquefaction unit after purification and drying and the chlorine is made available directly for consumption or is processed into hypochlorite. This latter step is generally carried out in a unit that is present in every electrolysis unit for the purification of chlorine-containing waste gas and exhaust air. If the chlorine produced contains x% of hydrogen, and the hydrogen content in the gas space must not exceed y% in the liquefaction, the relation of liquefied chlorine/chlorine eliminated in the gaseous state is to be smaller than $(y:x)-1$.

It is considered a drawback of all alkali metal chloride electrolyses operated without pressure that the drying of the chlorine is complicated (high specific consumption of siccative, for example 35 kg of $H_2SO_4$ per ton of chlorine) also the liquefaction of chlorine is expensive due to the compressor unit and/or the cooling device required.

It is known to operate alkali metal chloride electrolyses at a pressure of 7 bars at a maximum, in order to reduce among other things the mechanical compression effort required in the liquefaction of the chlorine (German Offenlegungsschrift No. 2,729,589). Yet this method is disadvantageous in that a compressor or refrigerating unit must be used in order to liquefy the gaseous chlorine leaving the electrolytic cell.

From German Offenlegungsschrift No. 2,348,889 it is known to electrolyze aqueous sodium chloride solutions at a pressure of from about 7 to 70 $kg/cm^2$. In the course of this process the chlorine may be obtained at the anode in a dissolved, gaseous or liquid form. Chlorine separated in a gaseous state, which is hot and moist, is at first condensed and thereafter dried (description of FIG. 6). However, it is not stated in this passage that in the condensation a minimum temperature of no less than about 28° C. must be maintained and that the phases of liquid chlorine and water which are present in the condensation are to be separated before drying. Thus, the known process does not help to reduce the necessary amount of siccative.

It is an object of the present invention to further reduce the expenditure of drying and liquefying the chlorine produced in a gaseous state in the electrolysis of alkali metal chloride.

There has now been found a process for the production of liquid chlorine, which starts from the mixture of anolyte and steam-saturated gaseous chlorine which is obtained in the anode space of an electrolytic cell in the electrolysis of an aqueous alkali metal chloride solution under a pressure of at least 8 bars, by separating at first the anolyte from the steam-saturated gaseous chlorine and liquefying the steam-saturated gaseous chlorine under a pressure of at least 8 bars by cooling, which comprises not allowing the temperature of the condensate consisting of a liquid water-saturated chlorine phase and a liquid chlorine-saturated water phase to fall below 28° C. during cooling and separating the water phase of a light specific weight from the chlorine phase of a heavier specific weight.

Hence, in this process the liquefaction of the gaseous chlorine is carried out without a pressure increase. In principle, it is even possible to reduce the pressure prior to liquefaction, for example from 10 to 8.5 bars, if the liquefaction unit has not been designed for high pressures.

A liquefaction at pressures of less than 8 bars makes it necessary to cool the chlorine to a temperature of less than 28° C. In the process solid chlorhydrate and liquid chlorine are obtained, which makes the further work-up far more difficult. This process requires a complicated drying of the gaseous chlorine prior to liquefaction. The partial pressure of chlorine in the anode space should be at least 8 bars.

If the liquefaction pressure falls below 5 bars, it is not even possible to achieve liquefaction with cooling water of 10° C., and therefore refrigerating units are additionally needed.

The liquid chlorine phase is separated from the water phase preferably by means of a layer separator. The separated chlorine-containing water layer may be recirculated into the electrolysis cycle. The liquefied chlorine contains only a small amount of dissolved water, which facilitates drying. It is possible, for example, to bind the water to dehydrating agents, such as lithium chloride, calcium chloride, and especially sulfuric acid. The water may also be bound by adsorption to solid substances of a large specific surface, for example, silica gel and molecular sieves.

With a constant anolyte level, the pressure in the system of anode space/liquefaction unit would continue to increase by the chlorine set free, if merely liquefied chlorine is eliminated. In order to maintain the pressure at a constant level, it is necessary to remove the non-condensable portions of the gas, together with the chlorine. This is also necessary since the presence of hydrogen in chlorine can never be completely avoided in the membrane cell process, and especially in the amalgamation process. If there is only removed chlorine in a liquid state, the hydrogen content of the uncondensed gas would continue to increase. The explosion limit for hydrogen in pure chlorine at normal pressure is somewhat above 6% of $H_2$. For safety reasons, the hydrogen pressure of the waste gas in most liquefaction units is not more than 4%. Therefore, in most cases only 80 to 90% of the chlorine gas is liquefied in obtaining chlorine from amalgamation processes, and the residual 10 to 20% with the inert gases and the hydrogen contained therein is used as exhaust chlorine (Ullmanns Encyklopädie der technischen Chemie, volume 5, 1954, page 308). It is preferred to perform the electrolysis with a pressure of from 8 to 20 bars in the anode space. At a pressure of from 8 to 15 bars, a liquefaction temperature of from 28° to 50° C. is sufficient. Particularly preferred are pressures in the anode space of from 9 to 12 bars.

The temperature of the anolyte should be above the boiling point of chlorine at operating pressure. Thus, the anolyte temperature is at least 28° C., preferably more than 90° C. It is especially favorable if the anolyte has a temperature which is above the boiling point of chlorine at atmospheric pressure. Particularly advantageous are temperatures in the range of from 105° to 140° C., especially from 110° to 130° C. in the anolyte.

The latent heat generated in the condensation of the chlorine and the steam may in some cases be used for heating products entering the cell. However, it is particularly advantageous to use this heat for the evaporation of the catholyte of the electrolytic cell. An evaporation of this kind may take place for example in vacuo, by heating directly with the condensation heat. It is also possible to re-heat the catholyte, which is concentrated in vacuo and cooled, by using the latent evaporation heat of the chlorine/water mixture.

In order to avoid the development of a high hydrogen content in the non-liquefied components during the condensation of chlorine, it may be suitable to add a small amount of inert gas to the uncondensed components. This gas may be added before, during or after the liquefaction of the chlorine. In this manner the pressure within the system may also be increased, which is particularly important for starting the operation of the electrolytic cells. The gases added are not liquefied at 8 bars and 28° C., do not react with chlorine and show poor solubility in liquid chlorine. Suitable inert gases are for example the noble gases, but especially preferred are nitrogen or air.

After separation from the water layer and drying, the liquid chlorine obtained at a temperature of more than 28° C. may be further cooled to 20° C., for example with the aid of cooling water.

It is advantageous that water exhibits poor solubility in liquid chlorine since this helps reduce the expense of drying chlorine. It is further advantageous that the gases being treated and present under pressure occupy small volumes, so that the apparatuses required for condensation, phase separation and drying may also be of small dimensions. According to the process of the invention, the liquefaction of the chlorine is possible without any refrigerating unit and/or compressor. Finally, the application of a higher pressure makes it possible also to increase the cell operating temperature, which has a favorable effect on current consumption.

German Offenlegungsschrift No. 2,745,033, discloses an electrochemical cell for the storage of electric energy, in which chlorine is separated in a liquid form. The chlorine is consumed upon discharging the cell. It is considered advantageous in this publication that the expense of energy and apparatuses required is reduced, since no gas phase is to be passed during the formation and back reaction. In a typical embodiment the pressure is from 8 to 10 bars, the temperature being 30° C. For the industrial production of chlorine during alkali metal chloride electrolysis, a process of the kind described in Offenlegungsschrift No. 2,745,033 would be disadvantageous, because due to the lower conductivity of the electrolyte, the specific energy consumption at 30° C. is markedly higher than with the temperatures of about 80° C. which are comon in alkali metal chloride electrolyses. Furthermore, it would be complicated to dissipate the generated heat of the cell at this low temperature. Also, the generated heat would be obtained in a form which is hardly usable in practice. However, with a rising operation temperature the operating pressure would automatically rise rapidly as exhibited by the liquefaction pressure of chlorine which at 80° to 100° C. is about 27 to 39 bars. This unfavorable coupling of operating temperature and operating pressure is not present when generating and removing gaseous chlorine (combined with subsequent liquefaction).

The invention will now be described in further detail and by way of example with reference to the accompanying drawing.

The mixture of gas and liquid being discharged from the electrolytic cells (not shown) (said mixture containing per kilogram of brine approximately 230 g of NaCl, 770 g of water, 5.74 standard liters of chlorine, 0.002 to 0.02 standard liter of hydrogen and from 0.05 to 0.5 standard liter of oxygen) is passed via conduit (1) into separator (2). In this separator, liquid brine (21) separated from the gas, but still containing dissolved chlorine, is obtained and eliminated via conduit (3). It may subsequently be freed from dissolved chlorine and fed again to the cells after saturation. When passing the mist collector layer (4), the steam and gases are freed from entrained brine drops and are then passed via conduit (5) into condenser (6) which is cooled by cooling water fed in and discharged via conduits (7) and (8), respectively.

The condenser has advantageously been designed in a way that liquid condensate and non-condensable components may be discharged through different conduits. Thus, it is ensured that the level of the liquid phases in the subsequent layer separator (11) is not disturbed by gas bubbles. The condensate produced in condenser (6) is passed via conduit (9) into the layer separator (11), where it separates to give a water layer and a chlorine layer. In this process, baffle (12) prevents a swirling of the liquid phases. The gases and vapors which have not been liquefied in condenser (6) are passed via coduit (10) into the gas space of layer separator (11). Only the aqueous phase (22 A) of a lighter specific weight passes over weir (13).

The overflowing phase (22 B) is eliminated via conduit (16) and valve (17). Said valve (17) is regulated by the level of liquid of (22 A). The aqueous phase (22 B) may be added to the pure brine (not shown) in a non-depressurized state. Below the aqueous layer (22 A), yet separated by a boundary layer, there is the liquid chlorine (23) which is passed via conduit (18) and regulating valve (19) into drying unit (20). Regulating valve (19) is regulated by the level of liquid (23).

The pressure throughout the entire system of 8 to 12 bars is maintained by means of pressure regulating valve (15) below a given maximum. The gas formation in the electrolysis has a pressure-increasing effect. The uncondensed gases leave this part of the apparatus via said valve (15) and conduit (14). In conformity with the conditions of equilibrium they contain steam, a small amount of hydrogen (1% at a maximum) and oxygen, besides chlorine (about 2 to 3% of the amount of chlorine produced electrolytically). This mixture is used for the preparation of bleaching liquor.

In most cases an apparatus of this kind is operated at a cell pressure of from 8 to 12 bars and a cell temperature of from 90° to 140° C.

For a chlorine production of 20 tons per hour using a starting concentration of the brine of 26% by weight of NaCl and a brine exhaustion to 22% by weight of NaCl, a brine circulation of 825 tons per hour is necessary. The brine leaves the separator arranged behind the electrolytic cells with cell temperature. From 1200 to 1600 kg of chlorine per hour are dissolved under pressure in said brine (6 to 8% of the amount produced electrolytically). The gases and vapors from the separator consisting substantially of 18,400 to 18,800 kg of chlorine per hour and of 800 to 1000 kg of steam are liquefied for the most part in a condenser at about 35° C. Simultaneously, about $7.4 \times 10^6$ joules/h of heat must be dissipated. The liquid chlorine represents about 90% of the chlorine produced electrolytically. After separation from the water phase it is dried by extracting with concentrated sulfuric acid. As the liquid chlorine contains only from 7 to 10 kg of water per hour, only a small amount of $H_2SO_4$ is required for drying. The water phase is obtained in an amount of from about 800 to 950 kg/h and contains from about 35 to 45 kg of dissolved chlorine per hour.

What is claimed is:

1. A process for the production of liquid chlorine comprising the steps of electrolyzing an aqueous alkali metal chloride solution in an electrolytic cell under an operational pressure of at least 8 bars and at an anolyte temperature above the boiling point of chlorine at the operational pressure;

obtaining from the electrolysis a mixture of anolyte and steam-saturated gaseous chlorine in an anode space of the electrolytic cell;

separating the anolyte from the steam-saturated gaseous chlorine;

liquefying the steam-saturated gaseous chlorine under a pressure of at least 8 bars to a condensate after the steam-saturated chlorine passes out of the electrolytic cell by cooling the steam-saturated gaseous chlorine, said cooling comprising maintaining a temperature of at least 28° C. of the condensate which includes a liquid water-saturated chlorine phase and a liquid chlorine-saturated water phase; and separating the water phase from the chlorine phase which has a heavier specific weight than the water phase.

2. The process as claimed in claim 1, which comprises drying the liquid chlorine phase after separation from the water phase.

3. The process as claimed in claim 2, which comprises eliminating the water dissolved in the liquid chlorine by means of concentrated sulfuric acid.

4. The process as claimed in claim 1, which comprises maintaining the pressure in the anode space constant by way of the regulated elimination of gases not having condensed in the chlorine liquefaction.

5. The process as claimed in claim 1, which comprises effecting the liquefaction of the chlorine at a temperature of from about 28° to 50° C.

6. The process as claimed in claim 5, which comprises maintaining the pressure in the anode space in the range of from 9 to 12 bars.

7. The process as claimed in claim 1, which comprises recirculating the chlorine-containing water phase having been formed in the liquefaction, after separating it from the liquid chlorine phase, in a non-depressurized state into the electrolyte circulation of the alkali metal chloride electrolysis.

8. The process as claimed in claim 1, which comprises using the heat generated in the condensation of the chlorine and the steam for evaporating a catholyte of the electrolytic cell.

9. The process as claimed in claim 1 or 4, which comprises adding a small amount of inert gas to gas not having condensed in the liquefaction of the chlorine.

10. The process as claimed in claim 1, which comprises separating the water phase from the chlorine phase in a layer separator and discharging the two phases separately in a regulated manner.

* * * * *